US010155423B1

(12) United States Patent
Gebheim

(10) Patent No.: US 10,155,423 B1
(45) Date of Patent: Dec. 18, 2018

(54) COLLET RECEIVER HITCH

(71) Applicant: Gerald Carl Gebheim, New London, WI (US)

(72) Inventor: Gerald Carl Gebheim, New London, WI (US)

(*) Notice: Subject to any disclaimer, the term of this patent is extended or adjusted under 35 U.S.C. 154(b) by 0 days.

(21) Appl. No.: 15/954,885

(22) Filed: Apr. 17, 2018

(51) Int. Cl.
*B60D 1/52* (2006.01)
*B60D 1/24* (2006.01)
*B60D 1/01* (2006.01)
*B21K 21/12* (2006.01)

(52) U.S. Cl.
CPC ............... *B60D 1/52* (2013.01); *B21K 21/12* (2013.01); *B60D 1/01* (2013.01); *B60D 1/249* (2013.01)

(58) Field of Classification Search
CPC . B21K 21/12; B60D 1/01; B60D 1/52; B60D 1/249
USPC ...................................................... 280/491.5
See application file for complete search history.

(56) References Cited

U.S. PATENT DOCUMENTS

| 3,630,321 | A | * | 12/1971 | Hollnagel | B60T 7/20 188/112 R |
|---|---|---|---|---|---|
| 4,050,714 | A | * | 9/1977 | Epp | B60D 1/06 280/495 |
| 5,203,194 | A | | 4/1993 | Marquardt | |
| D409,960 | S | | 5/1999 | Young | |
| 5,988,667 | A | * | 11/1999 | Young | B60D 1/155 280/506 |
| 6,073,952 | A | * | 6/2000 | Schulz | B62D 53/0842 280/433 |
| D466,845 | S | | 12/2002 | Kutzscher | |
| D483,704 | S | | 12/2003 | Fandrich | |
| 6,820,890 | B2 | | 11/2004 | Westerdale | |
| 7,052,778 | B2 | | 5/2006 | Sorgi | |
| 7,412,864 | B2 | | 8/2008 | Jones | |
| 7,641,214 | B2 | | 1/2010 | Kahl | |
| 8,079,612 | B1 | | 12/2011 | Tambornino | |

* cited by examiner

*Primary Examiner* — Joseph M Rocca
*Assistant Examiner* — Felicia L. Brittman

(57) ABSTRACT

The subject invention, a collet receiver hitch, has a receiver tube with collet features, and a collet collar to eliminate the problem movement of the draw bar/mount inside the receiver. The first part is a collet receiver tube with an open end for accepting the ball mount shank. The second part is an outside collet collar. The outside collet collar is drawn onto the collet receiver tube, thereby causing the wedging action that, in turn, centers and holds the mount shank. The hitch pin is still required, and its use does not impair the subject invention.

15 Claims, 3 Drawing Sheets

COLLET RECEIVER HITCH

CROSS REFERENCE TO RELATED APPLICATIONS

Application Ser. No. 15/950,273 Hitch Receiver—Mount Centering Wedge System is used with current conventional receiver/mount hitches to secure the draw bar.

Application Ser. No. 15/950,481 Hitch Receiver With An Internal Collet is new receiver to replace existing receiver during new manufacture.

BACKGROUND

Receiver type hitch assemblies are widely used for numerous applications: towing trailers, cargo racks, bicycle racks, tents, hoists, and more. There are SAE established weight rating and classes: Class I, II, III, and IV. Some manufacturers even use a class V designation, but this is not an SAE standard. These classes vary in physical dimensions and material strengths. All of these hitch assemblies have three parts: 1, a receiver—a square tube with a reinforcing lip around the rearward opening to absorb the loads from the trailer—that is a component of the hitch assembly that is firmly attached to the tow vehicle; 2, a draw bar, (ball mount, rack mount, mount), that is square and may be of tubular or solid construction, that fits inside the receiver to carry the applied loads; and 3, a hitch pin that passes through holes in the receiver walls and a hole in the draw bar to secure the draw bar in place. The draw bar and hitch pin are easily inserted into and removed from the receiver to facilitate interchangeability. The resultant problem of all these hitches is that the draw bar and hitch pin are loose inside the receiver, allowing the draw bar to move up/down, left/right, and in/out as the load forces are applied to it. This action causes wear and tear on the hitch components, leading to some instability, possible failures, and noise. There have been numerous patents issued for inventions proposed to address this problem. Some use a screw and threaded attachment that, when tightened, bias the draw bar against the inside of the receiver. Some of the prior art patents require no modifications to the existing components. However, many of these patents disclose highly modified draw bars that wedge themselves into the receiver along a single axis, generally up/down. These modified draw bars may not meet the SAE standards. All of the cited patents address fixing the problem created by the current hitch assemblies' designs. The patents cited in the IDS are examples of replacement receiver designs, none of which use the current mount configurations. The intention of the instant invention is to address the problem by creating a new receiver tube design that eliminates the problem and will work without modification to existing mount/draw bar components.

BRIEF SUMMARY OF INVENTION

The subject invention creates a new two-part receiver that eliminates the problem movement of the draw bar/mount inside the receiver tube by making the receiver tube a collet to clamp and hold the mount. The first part is a new receiver tube with collet features added to open end. The new receiver tube is a component member of the vehicle attachment system when it is fabricated, and would replace the current receiver configuration. The second part is a outside collet collar. The outside collet collar may be attached to the receiver via the hitch pin or threaded fasteners, and is drawn onto the receiver tube, thereby causing the wedging/clamping action that, in turn, centers and holds the draw bar. The hitch pin is still required.

DETAILED DESCRIPTION

The Collet Receiver Hitch will replace the traditional receiver in the receiver/ball mount type hitches common today. The two-part collet receiver design eliminates the problem movement of the draw bar inside the receiver by closing the gap with the collet receiver tube and an outside collet collar.

The collet receiver tube and outside collet collar provide a method to center and tighten the ball mount shank inside the collet receiver tube, preventing movement and resultant wear due to the loose fit that is required for hitch functions of assembly and interchangeability. The subject invention uses the hitch pin to secure the mount shank inside the receiver.

Figure 1:
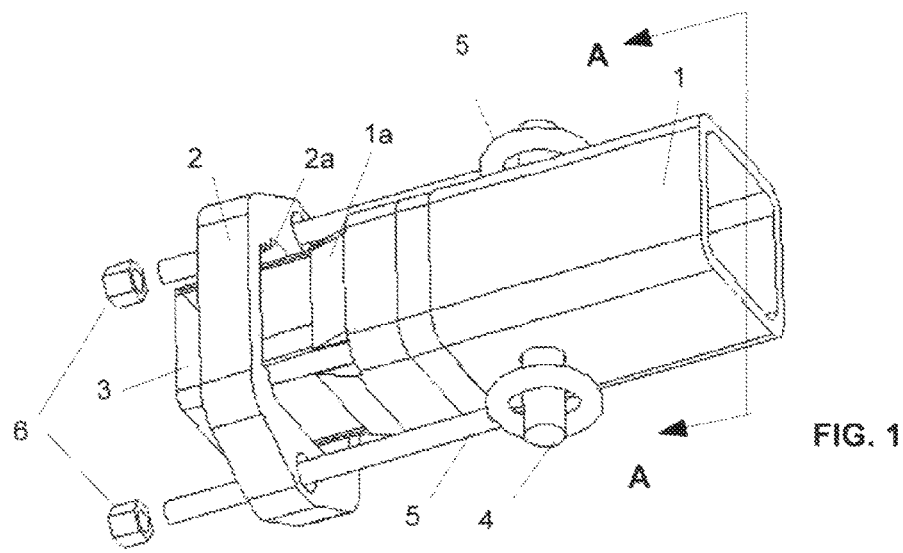
FIG. 1 is exploded isometric view showing the two part collet receiver, the receiver tube is firmly attached to the vehicle, the outside collet collar, and draw bar shank in place with the eye bolts attached to hitch pin.

FIG. 1 shows the collet receiver hitch using 2 eye bolts 5 as the method for holding the outside collet collar 2 onto the collet receiver tube 1, oriented so the internal tapered surfaces 2a are directed toward the collet receiver tube external tapered surfaces 1a. The ball mount shank 3 slidably fits through the outside collet collar 2 and into the receiver tube 1, allowing the hitch pin 4 to be put into place. The outside collet collar 2 is connected to the receiver tube 1 via 2 eye bolt fasteners 5 passing through holes in the outside collet collar 2 and hex nuts 6 for applying a force, that, when tightened drive the outside collet collar 2 tapered internal surfaces 2a onto the receiver tube tapered external surfaces 1a, thereby forcing the collet receiver tube walls into contact with the ball mount shank 3.

Figure 3:
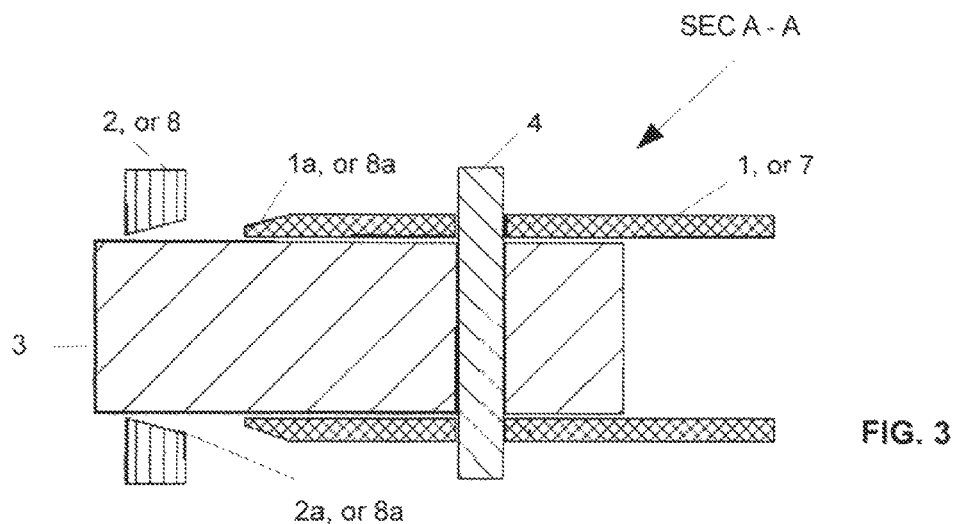
FIG. 3 is horizontal cross sectional view on the center line, showing the outside collet collar tapered surfaces facing the tapered opening of the collet receiver tube.

See FIG. 3 showing the cross section A-A of the collet receiver hitch with the outside collet collar tapered internal surfaces 2a not in contact with the collet receiver tube external tapered surfaces 1a, therein no forced contact with the ball mount shank 3.

Figure 4:
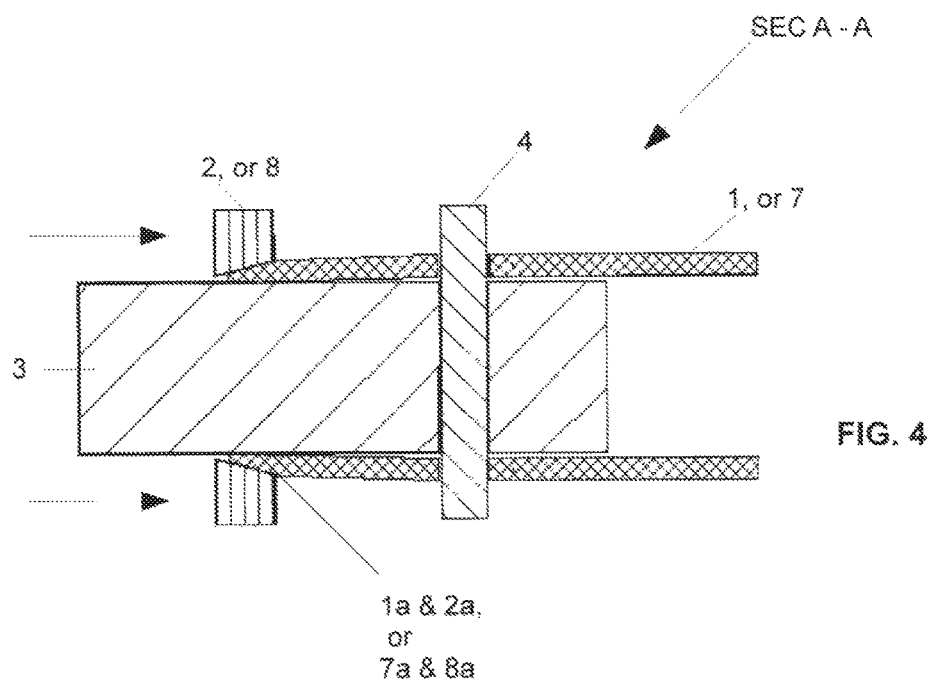
FIG. 4 is horizontal cross sectional view on the center line, showing the outside collet collar tapered surfaces engaging the tapered opening of the collet receiver tube.
Figure 5:
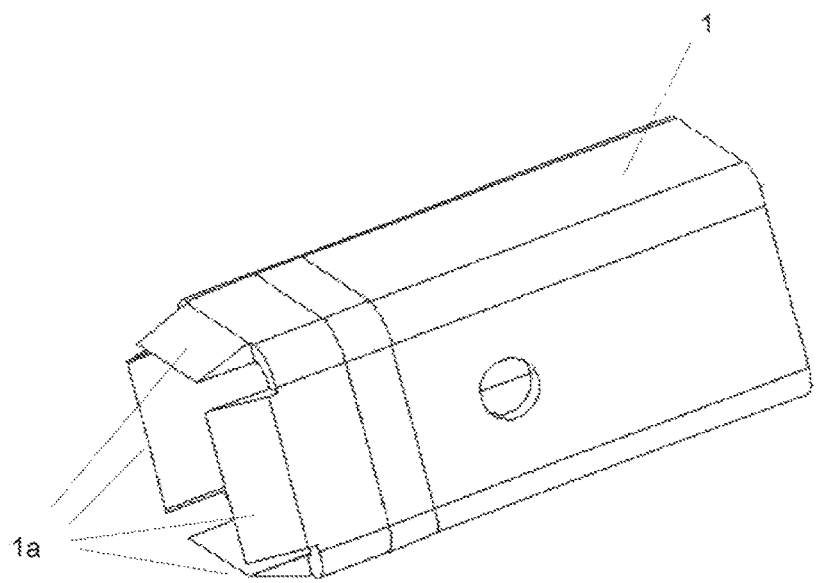
FIG. 5 is a prospective view of the collet receiver tube with the tube corners removed and the external tapered surfaces.
Figure 6:
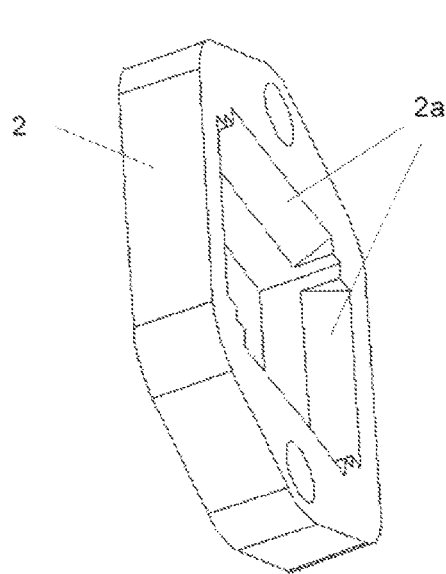
FIG. 6 is a prospective view of the outside collet collar with internal tapered surfaces and 2 holes for eye bolts.
Figure 7:
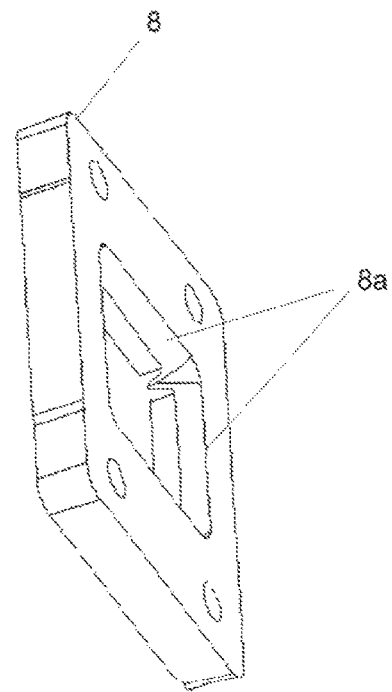
FIG. 7 is a prospective view of the outside collet collar with internal tapered surfaces and 4 holes for bolts.

See FIG. 4 showing the cross section A-A of the collet receiver hitch with the outside collet collar internal tapered surfaces 2a in contact with the collet receiver tube tapered external walls 1a, therein forcing contact with the ball mount shank 3.

Figure 2:
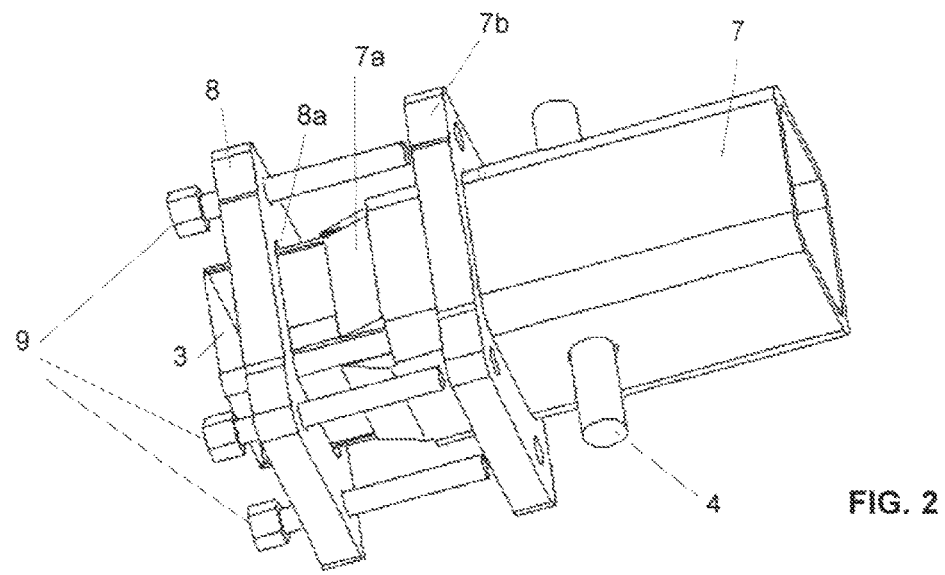
FIG. 2 is exploded isometric view showing the two part collet receiver, the receiver tube with the flange anchor is firmly attached to the vehicle, the outside collet collar, and the draw bar shank in place with 4 hex bolts holding the outside collet collar.

FIG. 2 shows the collet receiver using 4 hex bolts 9 as the method for holding the outside collet collar 8 onto the collet receiver tube 7 via connection to the collet receiver tube flange 7b. The outside collet collar 8 is oriented so the internal tapered surfaces 8a are directed toward the collet receiver tube tapered external surfaces 7a. The ball mount shank 3 slidably fits through the outside collet collar 8 and into the receiver tube 7, allowing the hitch pin 4 to be put into place. The outside collet collar 8 is connected to the receiver tube 7 via 4 hex bolt fasteners 9 passing through holes in the outside collet collar 8 and threadably attached to the collet receiver tube flange 7b. The hex bolts 9 are tightened to drive the outside collet collar 8 tapered internal surfaces 8a onto the receiver tube tapered external surfaces 7s, thereby forcing the collet receiver tube walls into contact with the ball mount shank 3.

See FIG. 3 showing the cross section A-A of the collet receiver hitch with the outside collet collar internal tapered surfaces 8a not in contact with the collet receiver tube external tapered surfaces 7a, therein no forced contact with the ball mount shank 3.

See FIG. 4 showing the cross section A-A of the collet receiver hitch with the outside collet collar internal tapered surfaces 8a in contact with the collet receiver tube external tapered walls 7a, therein forcing contact with the ball mount shank 3.

I claim:

1. A collet receiver mechanism comprising:
    a square collet receiver tube, said square collet receiver tube comprises an open end with tapered flexible walls, said square collet receiver tube further comprises a collet receiver tube flange affixed to an outside,
    an outside collet collar member with a central aperture configured to accept a ball mount shank;
    a tensioning means for anchoring said outside collet collar member to said collet receiver tube flange, urging said outside collet collar member onto said collet receiver tube open end with tapered flexible walls and forcing said tapered flexible walls to flex, thereby contacting the ball mount shank.

2. The collet receiver mechanism of claim 1 wherein said collet receiver tube flange is spaced away from said open end of said square collet receiver tube and has an array of threaded apertures to allow fasteners to connect therethrough.

3. The collet receiver mechanism of claim 1 wherein said open end with tapered flexible walls has four tapered external wall surfaces.

4. The collet receiver mechanism of claim 1 wherein said open end with tapered flexible walls is formed by removal of corner portions of said square collet receiver tube so as to form flexible flat wall portions.

5. The collet receiver mechanism of claim 1 wherein said collet receiver tube flange has an array of apertures configured to allow fasteners to pass therethrough.

6. The collet receiver mechanism of claim 3, wherein said central aperture of said outside collet collar member has tapered internal surfaces.

7. The collet receiver mechanism of claim 1 wherein bolts are provided with an anchoring feature, to engage said outside collet collar member, and a threaded portion is spaced from said anchoring feature and threadably mounted to said collet receiver tube flange.

8. The collet receiver mechanism of claim 6 wherein tightening said tensioning means urges said outside collet collar member forcefully onto said collet receiver tube tapered flexible walls causing contact between said tapered internal surfaces of the outside collet collar member and said tapered external wall surfaces of said collet receiver tube tapered flexible walls, thereby flexing the walls onto the ball mount shank, thereby centering and holding said ball mount shank in position.

9. The collet receiver mechanism of claim 8 wherein by loosening said tensioning means, the outside collet collar member is allowed to back away from the collet receiver tube, thereby unclamping said ball mount shank, thus allowing its removal.

10. A collet receiver mechanism having a square tube with an open end with tapered flexible walls, and an outside collet collar that fits onto the open end of said square tube comprising:
    a collet receiver tube comprising said open end of said square tube, wherein said open end of said square tube has four external tapered-wall surfaces formed by removal of corner portions of said square collet receiver tube, creating said tapered flexible walls;
    said outside collet collar comprising a central aperture with internal tapered surfaces configured to accept a ball mount shank, said outside collet collar further comprising an array of apertures to accept fasteners;
    a tensioning means for anchoring said outside collet collar to a hitch pin with fasteners and hex nuts, and urging said outside collet collar onto said collet receiver tube open end, and forcing said tapered flexible walls to flex into contact with the ball mount shank.

11. The collet receiver mechanism of claim 10 wherein the fasteners are provided with an anchoring feature to engage the hitch pin, and a threaded portion spaced from said anchoring feature and passing through the apertures of said outside collet collar to engage said hex nuts.

12. The collet receiver mechanism of claim 10 wherein tightening said hex nuts on fastener threaded portions will provide force to urge said outside collet collar onto said collect receiver tube causing contact between the internal tapered surfaces of the outside collet collar and the external tapered wall surfaces of said collet receiver tube tapered flexible walls, thereby flexing said collet receiver walls onto said ball mount shank, thus centering and holding the ball mount shank in position.

13. The collet receiver mechanism of claim 12 wherein loosening the hex nuts removes said force from said outside collet collar, allowing said outside collet collar to back away from said collet receiver tube, thereby unclamping said ball mount shank, thus allowing removal when said hitch pin is removed.

14. The collet receiver mechanism of claim 10 wherein the fasteners are 2 eye bolts, said outside collet collar aperture array is 2 holes with 2 hex nuts for tensioning.

15. The collet receiver mechanism of claim 10 wherein the fasteners are 2 u bolts, said outside collet collar aperture array is 4 holes with 4 hex nuts for tensioning.

* * * * *